No. 870,263. PATENTED NOV. 5, 1907.
W. R. WARREN.
CLUTCH.
APPLICATION FILED MAR. 7, 1906.

WITNESSES:
William Miller
Edward Wiesner

INVENTOR
William R. Warren
BY
W. C. Hauff
ATTORNEY

UNITED STATES PATENT OFFICE.

WILLIAM R. WARREN, OF NEW YORK, N. Y.

CLUTCH.

No. 870,263.

Specification of Letters Patent.

Patented Nov. 5, 1907.

Application filed March 7, 1906. Serial No. 304,724.

*To all whom it may concern:*

Be it known that I, WILLIAM R. WARREN, a citizen of the United States, residing at New York city, in the county and State of New York, have invented new and useful Improvements in Clutches, of which the following is a specification.

By means of this invention the jerk or suddenness caused by abrupt clutching can be avoided. A gradual clutching or gradual starting avoiding the shock of sudden start with consequent inconvenience or damage is to be preferred for example in automobiles and the like. The invention however is not limited to any specific employment.

Figure 1:
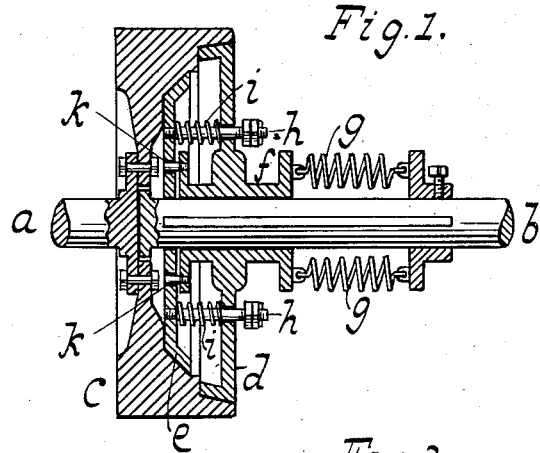
Figure 2:
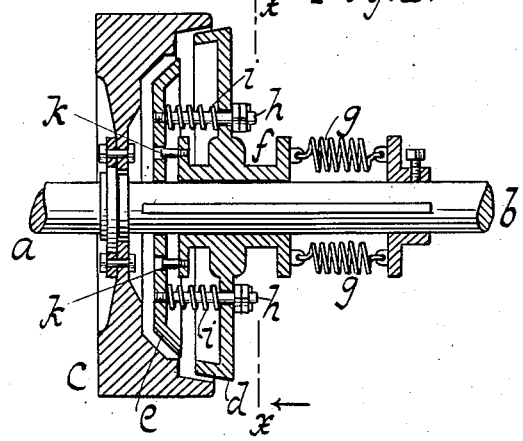
Figure 3:
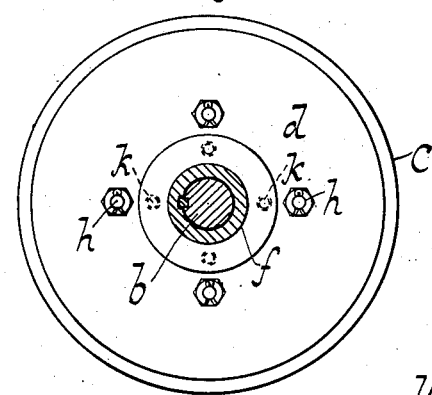

This invention is set forth in the following specification and claim and illustrated in the annexed drawing, in which:

Figure 1 shows the clutch in engagement. Fig. 2 shows the cluth out of engagement. Fig. 3 is a section along $xx$ Fig. 2.

In this drawing are shown two shafts $a$ and $b$ as also a clutch. One member of the clutch is indicated at $c$.

The other member of the clutch comprises two parts $d$ and $e$. These parts acting successively or non simultaneously the clutch is not at once brought to full engagement or clutched for its entire extent. The section $e$ is shown of flatter or shallower shape or with its face at a different angle than the face or engaging part of the section $d$.

The clutch members moving toward one another the part $e$ will first engage member $c$. This engagement allows slipping or lost motion to a certain degree with a gradual communication of motion from shaft to shaft.

As the clutch members move toward one another or one member moves to the other the clutch part $d$ is brought into engagement and the clutch is then in full engagement or grip with both parts $e$ and $d$ in action.

The clutch member $c$ is shown with seats or engaging parts corresponding to the parts $e$ $d$ or one of smaller diameter and different angle or inclination as compared with the other. The parts of smaller diameter are made to engage first and then those of larger diameter.

The clutch member $d$ or its hub part is shown with an annular groove $f$ for the engagement of a lever (not shown) as customary in clutches. Springs $g$ tend to move the clutch $d$ $e$ to engagement.

To the clutch section $e$ are secured studs $h$ which pass loosely through holes in the section $d$ but nuts or the like on the studs or bolts $h$ form stops to prevent the section $d$ slipping off the studs. Springs $i$ tend to move the sections $e$ and $d$ apart.

To the section $d$ are also fixed studs $k$ which fit loosely into holes in the section $e$. These studs $h$ $k$ compel the sections $d$ $e$ to rotate together but allow such sections to move toward and from one another.

As the clutch comes to engagement the part $e$ acts first and can slip to some extent. The parts $e$ and $d$ when both in grip with members $c$ cause a firm clutch or locking.

The springs $g$ can be braced against a collar or disk secured to shaft $b$. A feather connection between the clutch member part $d$ and shaft $b$ are also shown.

The shaft $a$ could be a driving shaft but this is not essential. The part $c$ could also be a fly wheel but not necessarily so.

The clutch is shown with the member part $e$ flatter and shallower or of different configuration than the part $d$. In other words the preliminary clutching is weaker than the other.

What I claim as my invention, and desire to secure by Letters Patent, is:

A clutch comprising the combination with a driving and a driven element, of a clutch member secured to one of said elements and provided with a pair of inclined seats having their walls at different degrees of flare or inclination, a clutch member slidably mounted upon the other of said elements and comprising two sections with differently inclined faces to respectively correspond to the inclines of the seats, loose connecting studs for the sections to compel the same to rotate together while allowing the same to move toward and from one another, springs for moving the sections apart, and means for moving the sections to and from the seats, the section of greater flare or flatter shape being placed in advance of the other section so that such section of flatter shape engages its seat before the other section comes into engagement.

In testimony whereof I have hereunto set my hand in the presence of two subscribing witnesses.

WILLIAM R. WARREN.

Witnesses:
 EDWARD WIESNER,
 GEORGE HULSBERG.